United States Patent
Soare et al.

(10) Patent No.: US 10,650,224 B2
(45) Date of Patent: *May 12, 2020

(54) FACIAL STRUCTURAL SHAPING

(71) Applicant: ANASTASIA BEVERLY HILLS, LLC, Los Angeles, CA (US)

(72) Inventors: Anastasia Soare, Beverly Hills, CA (US); Andrew Zuk, Beverly Hills, CA (US)

(73) Assignee: ANASTASIA BEVERLY HILLS, LLC, Los Angeles, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 15/680,255

(22) Filed: Aug. 18, 2017

(65) Prior Publication Data

US 2017/0364739 A1 Dec. 21, 2017

Related U.S. Application Data

(62) Division of application No. 14/927,382, filed on Oct. 29, 2015, now Pat. No. 9,760,762.

(60) Provisional application No. 62/074,511, filed on Nov. 3, 2014.

(51) Int. Cl.
*G06K 9/00* (2006.01)
*A45D 44/00* (2006.01)
*A45D 40/30* (2006.01)
*G06T 7/00* (2017.01)
*G06T 11/60* (2006.01)

(52) U.S. Cl.
CPC ......... *G06K 9/00248* (2013.01); *A45D 40/30* (2013.01); *A45D 44/005* (2013.01); *G06K 9/00281* (2013.01); *G06T 7/001* (2013.01); *G06T 11/60* (2013.01); *G06T 2207/30201* (2013.01)

(58) Field of Classification Search
CPC .......... G06K 9/00248; G06K 9/00281; A45D 44/005; A45D 40/30; G06T 11/60; G06T 2207/30201; G06T 7/001
See application file for complete search history.

(56) References Cited

U.S. PATENT DOCUMENTS

| | | | | |
|---|---|---|---|---|
| 4,886,079 A * | 12/1989 | Mooney | ................. | A45D 40/00 132/319 |
| 9,760,762 B2 * | 9/2017 | Soare | ................. | G06K 9/00248 |
| 2017/0049217 A1 * | 2/2017 | Ahn | ....................... | A45D 40/30 |

* cited by examiner

*Primary Examiner* — Pinalben Patel
(74) *Attorney, Agent, or Firm* — Greenberg Traurig, LLP

(57) ABSTRACT

An eyebrow shaping method includes providing an image of a face. Multiple guidelines are determined on the image and points and areas are located via the guidelines. A face is shaped with contouring and lightening to have Golden Ratio proportions via the different points and zones.

21 Claims, 17 Drawing Sheets

FACIAL STRUCTURAL SHAPING

RELATED APPLICATIONS

This application is a division of U.S. patent application Ser. No. 14/927,382, filed Oct. 29, 2015 and entitled FACIAL STRUCTURAL SHAPING, which claims priority from U.S. provisional patent Ser. No. 62/074,511 filed Nov. 3, 2014 and entitled FACIAL STRUCTURAL SHAPING. The contents of that application are incorporated herein in their entirety.

Steps of the operation include the following
1. Customer opens App on Mobile Device
2. In real-time, the App uses the camera to generate Facial Measurements Using Facial Measurement Engine
3. App uses measurements to give the Customer & in real time. There is a custom application of the cosmetics on their individual face using the camera
4. Gives the Customer a score based on their success following the Contour Recommendation Engine
5. Delivers Score to the Customer.

BACKGROUND OF THE DISCLOSURE

This disclosure relates to cosmetic materials, and in particular to facial shaping techniques, systems, methods and related devices.

The Golden Ratio is often denoted by the Greek letter φ ('phi'). It expresses a relationship that the sum of two quantities is to the larger quantity as the larger is to the smaller (its numerical approximation is 1.618033989). The Golden Ratio is a proportion universally found in Nature, expressed in the arrangement of branches along the stems of plants, in the placement of the shell spirals in snails, or in the features of the human body. The Golden Ratio is widely believed to be a natural principle related to the laws of equilibrium. Many great artists have proportioned their works according to the Golden Ratio, as it is believed to be aesthetically pleasing. Hence, a "perfect" face would display Golden Ratio proportions such as these: Distance from Top-of-the-head to Chin divided by Width-of-head equals φ; Length-of-Lips divided by Width-of-Nose equals φ; Outside distance between Eyes divided by Length-of-Lips equals φ; etc.

It follows that, on a "perfect" face, the high point (HP) of the eyebrow would divide the eyebrow arch at precisely the Golden Ratio point between the starting point of the eyebrow (SP) and the ending point of the eyebrow (EP) (SP-HP divided by HP-EP=φ).

Other features of the face can be formed, shaped, emphasized and de-emphasized according to appropriate proportions.

SUMMARY OF THE DISCLOSURE

One method and system in accordance with the present disclosure includes providing a frontal image of a person's face including the tip of the person's nose, nostrils, eyes including irises, supraorbital margins, and eyebrows.

Another method and system in accordance with present disclosure includes providing a plurality of facial templates, then positioning, one by one, each template of the plurality of templates such that the template aligns with the frontal image of a person's face.

Each template can be presented on a hard copy surface such as paper or a transparency and is used for overlaying on the face of the person. Alternatively the template can be provided as an electronic format and overlayed on a photo representation of the person's face.

Then the template is used to facilitate forming, shaping, emphasizing and de-emphasizing features of the face according to appropriate proportions and desired representations as provided on the templates.

The methods and systems in accordance with the present disclosure enable even a relatively unskilled beautician to quickly and accurately determine the most flattering, ideal shape of the facial features for any given customer according to the Golden Ratio standard and/or different desired characteristics.

Similarly the methods and systems can be used by surgeons in sculpting a face to meet the Golden Ratio standard and/or different desired characteristics.

Further features, advantages and characteristics of the embodiments of this disclosure will be apparent from reading the following detailed description when taken in conjunction with the drawing figures.

DETAILED DESCRIPTION

Figure 1A:
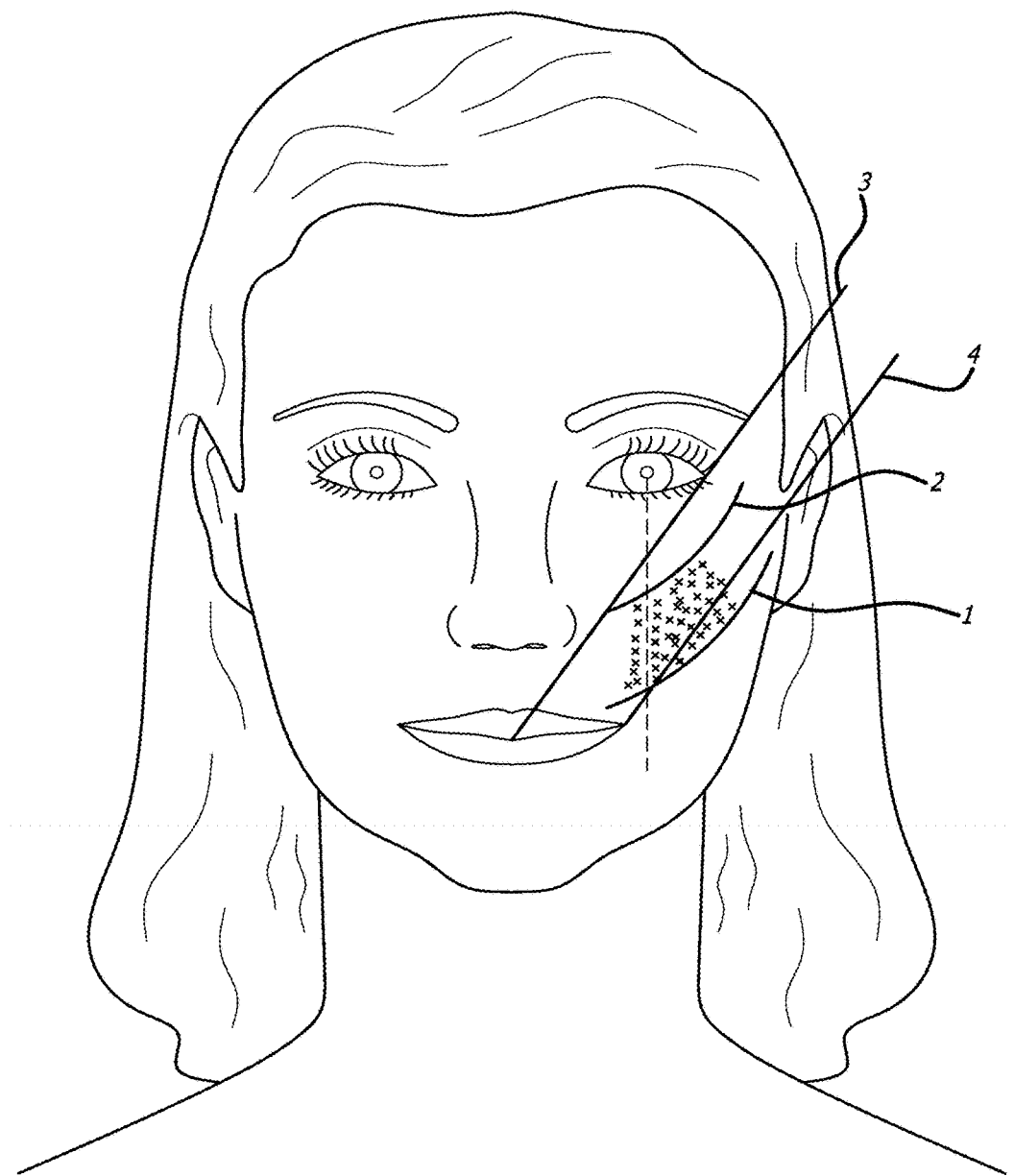
FIG. 1A is full-face frontal image of a person's face including various guide lines in accordance with a first form of the present disclosure.

A method comprises providing a frontal image of a person's face, including a base of the person's nose, tip end of the chin, cheeks, nostrils, eyes including irises, supraorbital margins, ears, and eyebrows. A first distance extends in length from a point at the base of the nose to the tip end of the chin; forming a first guide line on a cheek at a radius substantially equal to the first distance; the first guide line being user to demarcate a first limit for the application of contouring on the cheek.

A second distance is less than the first distance and is at the golden ratio proportion relative to the first distance and forming a second guide line on the cheek at a radius substantially at the golden ratio distance. The second guide line is used to demarcate a second limit for the application of contouring on the cheek; and the area between the two lines is demarcated for the application of contouring.

A facial stencil on the face with a cut out is applied and used to relate to the first and second guide lines, the stencil having at least one of peripheral outline including a straight edge or a straight line for location relative the face. The straight edge or the straight line is for location substantially horizontally or vertically relative to the face when contouring is to be applied to the face, such that the face and the stencil are aligned in a correct vertical sense with each other when the lines for contouring are demarcated. Makeup is applied to the face to represent and shape the contouring.

The method includes creating a third guide line from the center of the lips where the top and bottom lips meet each other, and directed towards the end of the eye. A fourth guide line is created from the end of the lips where the lips engage the face and the line extends wherein the third and fourth lines are substantially parallel.

The area between the third and fourth lines are demarcated for the application of highlighting, and selectively should there be an overlap between the area between the lines this is demarcated for the application of contouring and the area is demarcated for the application of highlighting, and then this area is blended.

A method comprises providing a frontal image of a person's face, including a tip of the person's nose, nostrils, eyes including irises, supraorbital margins, and eyebrows. A starting point for an eyebrow of each eye is determined, a fifth distance for that starting point is ascertained, the fifth distance being determined by determining the golden ratio proportion of the distance between the center of the irises of the two eyes such that the golden ratio point indicates the starting point of the respective eyebrow.

A facial stencil is used on the face to relate to the starting point and the determination of the fifth distance. The stencil has at least one of peripheral outline including a straight edge or a straight line for location relative the face, the straight edge or the straight line being for location substantially horizontally or vertically relative to the face when contouring is to be applied to the face. As such the face and the stencil are aligned in a correct vertical sense with each other when the starting point and the determination of the fifth distance are demarcated. Makeup is applied to the face to represent the starting point.

A method comprises providing a frontal image of a person's face, including a base of the person's nose, tip end of the chin, cheeks, nostrils, eyes including irises, supraorbital margins, ears, and eyebrows. A seventh prime distance extends in length from a point at the center of the lips to a point between at the base of the nose.

The seventh distance extends in length from at the top of the top lip at the center of the lip to a point between at the base of the nose. A position above the top lip is such that the seventh distance is less than the seventh prime distance and being at the golden ratio proportion relative to the seventh prime distance and forming a guide line substantially at the golden ratio distance. The guide line is used to demarcate a limit for the application of contouring above the top lip and directed towards the ends of the lips on either side of the center of the lips. The area below the guide line and the top of the lip is demarcated for the application of contouring.

A facial stencil is used on the face with a cut out to relate to the seventh distance and guide line. The stencil has at least one of peripheral outline including a straight edge or a straight line for location relative the face, the straight edge or the straight line being for location substantially horizontally or vertically relative to the face when contouring is to be applied to the face. The face and the stencil are aligned in a correct vertical sense with each other when the seventh distance and guide line are demarcated.

A method comprises providing a frontal image of a person's face, including a base of the person's nose, tip end of the chin, cheeks, nostrils, eyes including irises, supraorbital margins, ears, and eyebrows.

An eighth distance extends in length from a point at the base of the nose to the tip end of the chin. A ninth distance extends in length from a point at the base of the nose to a point between the eyebrows and above the nose. A tenth distance extends in length from the point between the eyebrows and above the nose to a hair line above the nose. The area in the tenth distance is demarcated for the application of contouring to an extent to render it in appearance conceptually equal to the eighth distance.

A facial stencil applied on the face with a cut out relates the eighth, ninth and tenth distance. The stencil has at least one of peripheral outline including a straight edge or a straight line for location relative the face, the straight edge or the straight line being for location substantially horizontally or vertically relative to the face when contouring is to be applied to the face. The face and the stencil are aligned in a correct vertical sense with each other when the eighth, ninth and tenth distance are demarcated.

A method comprises providing a frontal image of a person's face, including a base of the person's nose, tip end of the chin, cheeks, nostrils, eyes including irises, supraorbital margins, ears, and eyebrows. An iris diameter is measured, and at the tip of the nose a portion for highlighting equal to the iris diameter is formed.

A facial stencil is used on the face with a cut out to relate to the portion at the tip of the nose, the stencil having at least one of peripheral outline including a straight edge or a straight line for location relative the face, the straight edge or the straight line being for location substantially horizontally or vertically relative to the face when contouring is to be applied to the face. The face and the stencil are aligned in a correct vertical sense with each other when portion at the tip of the nose is demarcated.

Facial stencils are provided for use in a system of the disclosures.

As shown in FIG. 1A, there is a system and method comprising providing a frontal image of a person's face, including a base of the person's nose, tip end of the chin, cheeks, nostrils, eyes including irises, supraorbital margins, ears, and eyebrows.

The system and method comprises determining a first distance extending in length from a point at the base of the nose to the tip end of the chin.

Then there is formed a first guide line on a cheek at a radius substantially equal to the first distance; the first guide line being used to demarcate a first limit for the application of contouring on the cheek.

A second distance is determined being less than the first distance and being at the golden ratio proportion relative to the first distance.

A second guide line is formed on the cheek at a radius substantially at the golden ratio distance; the second guide line being used to demarcate a second limit for the application of contouring on the cheek.

The center of the curves of lines 1 and 2 is the center of the iris of the respective eye.

The area between the two lines is demarcated for the application of contouring.

The system includes creating a third guide line from the center of the lips where the top and bottom lips meet each other, and directed towards the end of the eye. A fourth guide line is created from the end of the lips where the lips engage the face and extending the line wherein the third and fourth lines being substantially parallel.

The area between the third and fourth lines is demarcated for the application of highlighting.

Selectively, should there be an overlap between the area between the lines demarcated for the application of contouring and the area demarcated for the application of highlighting, then this area is blended.

Figure 1B:
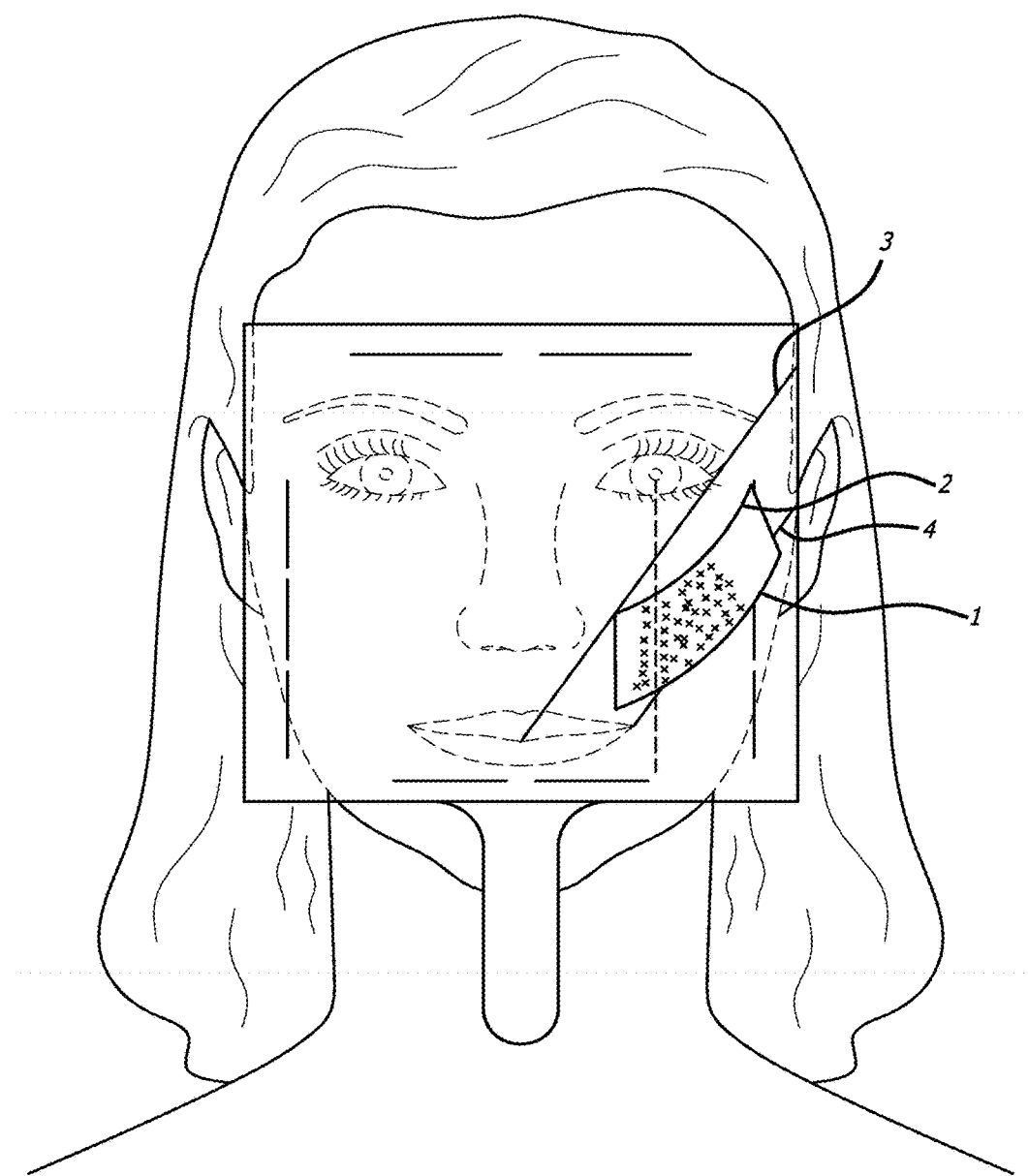
FIG. 1B is a mask for a full-face frontal image of a person's face including various guide lines in accordance with a first form of the present disclosure.

As shown in FIG. 1B, the implementation of the shaping of the face of FIG. 1A is achieved by using a mask or stencil 1a with cut outs, which can be physical or electronically depicted on a screen having the characteristics of an at least partly vertical periphery or lines 1b and an at least partly horizontal periphery or lines 1c. These lines are necessary so that when person lines up their fade with the mask there alignment is correct. The face of the person when aligned with the mask or stencil should be straight and vertically disposed with the mask or stencil guide lines or periphery so that the overall mask or stencil is correctly aligned and when used to establish the location of the lines 1, 2, 3 and 4 which are also formed or placed on the mask or stencil, the mask or stencil is correctly located relative to the face.

Figure 2A:
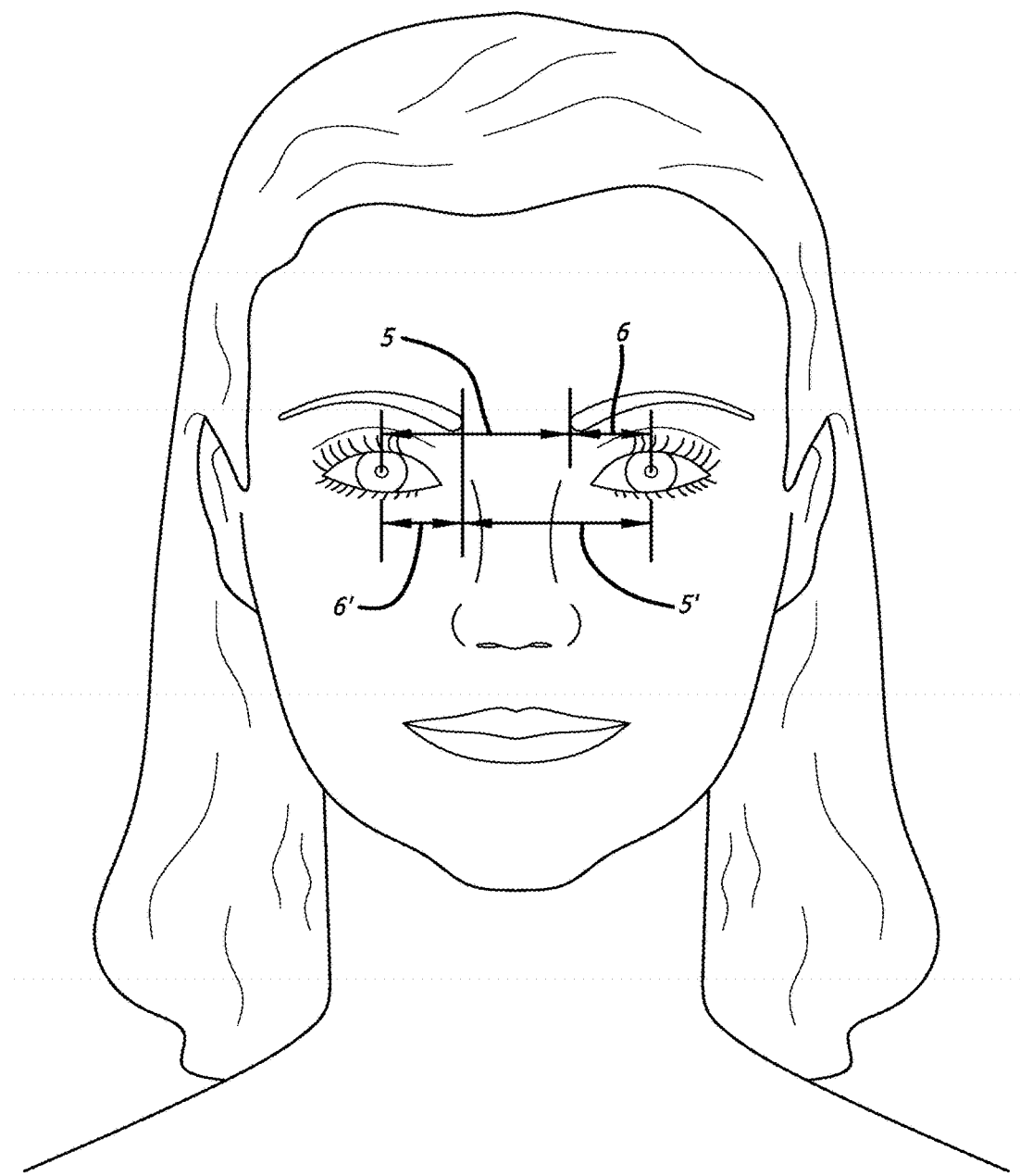
FIG. 2A is full-face frontal image of a person's face including various guide lines in accordance with a second form of the present disclosure.

As shown in FIG. 2A, there is a system and method comprising providing a frontal image of a person's face, including a tip of the person's nose, nostrils, eyes including irises, supraorbital margins, and eyebrows.

A starting point for an eyebrow of each eye is determined. A fifth distance for that starting point is ascertained. The fifth distance is determined by determining the golden ratio proportion of the distance between the center of the irises of the two eyes such that the golden ratio point indicates the starting point of the respective eyebrow.

Figure 2B:
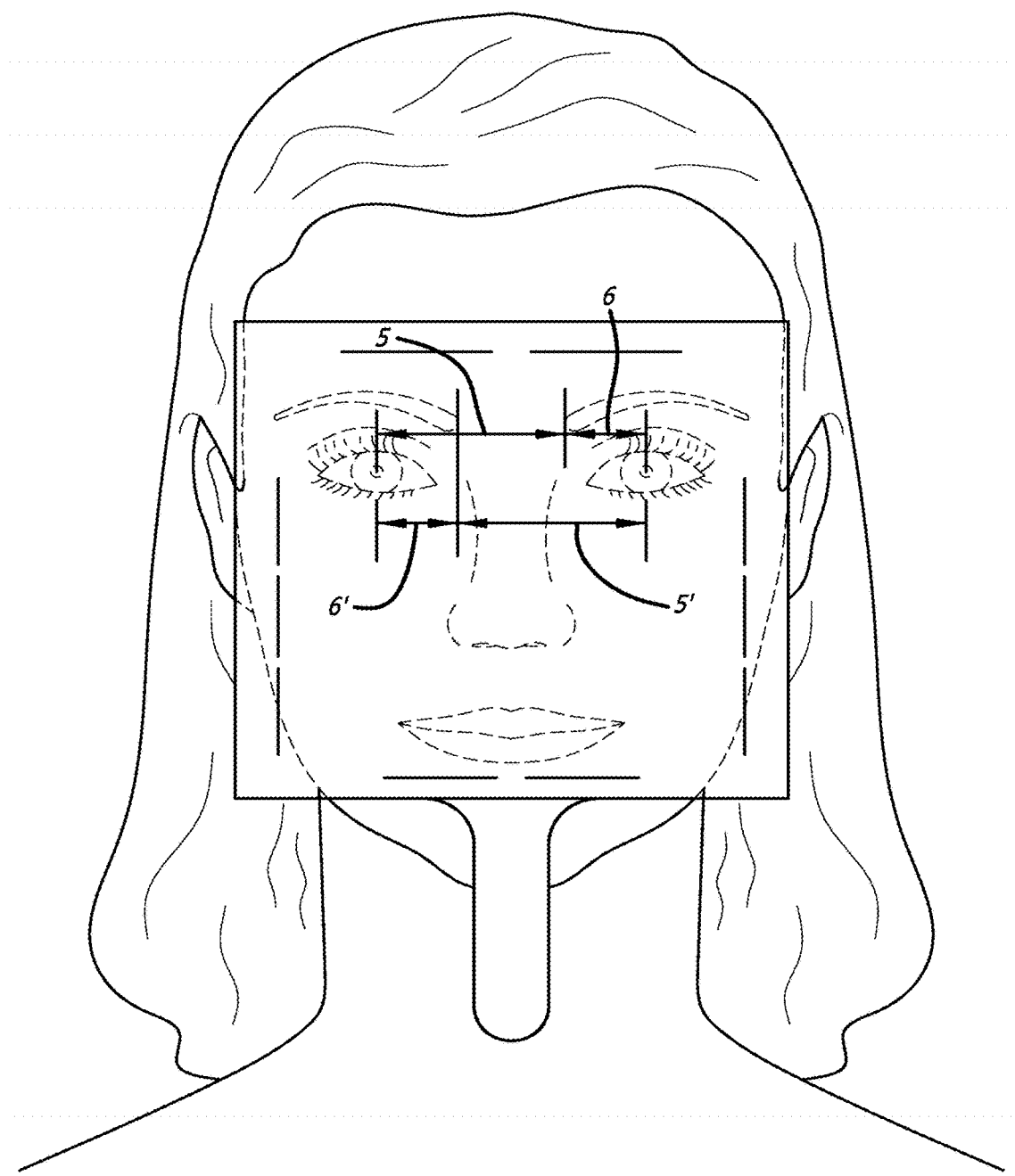
FIG. 2B is a stencil mask for a full-face frontal image of a person's face including various guide lines in accordance with a second form of the present disclosure.

As shown in FIG. 2B, the implementation of the shaping of the face of FIG. 2A is achieved by using a mask or stencil 2a with cut outs, which can be physical or electronically depicted on a screen having the characteristics of an at least partly vertical periphery or lines 2b and an at least partly horizontal periphery or lines 2c. These lines are necessary so that when person lines up their fade with the mask there alignment is correct. The face of the person when aligned with the mask or stencil should be straight and vertically disposed with the mask or stencil guide lines or periphery so that the overall mask or stencil is correctly aligned and when used to establish the location of the lines and spaces 5, 5', 6 and 6' which are also formed or placed on the mask or stencil, the mask or stencil is correctly located relative to the face.

Figure 3A:
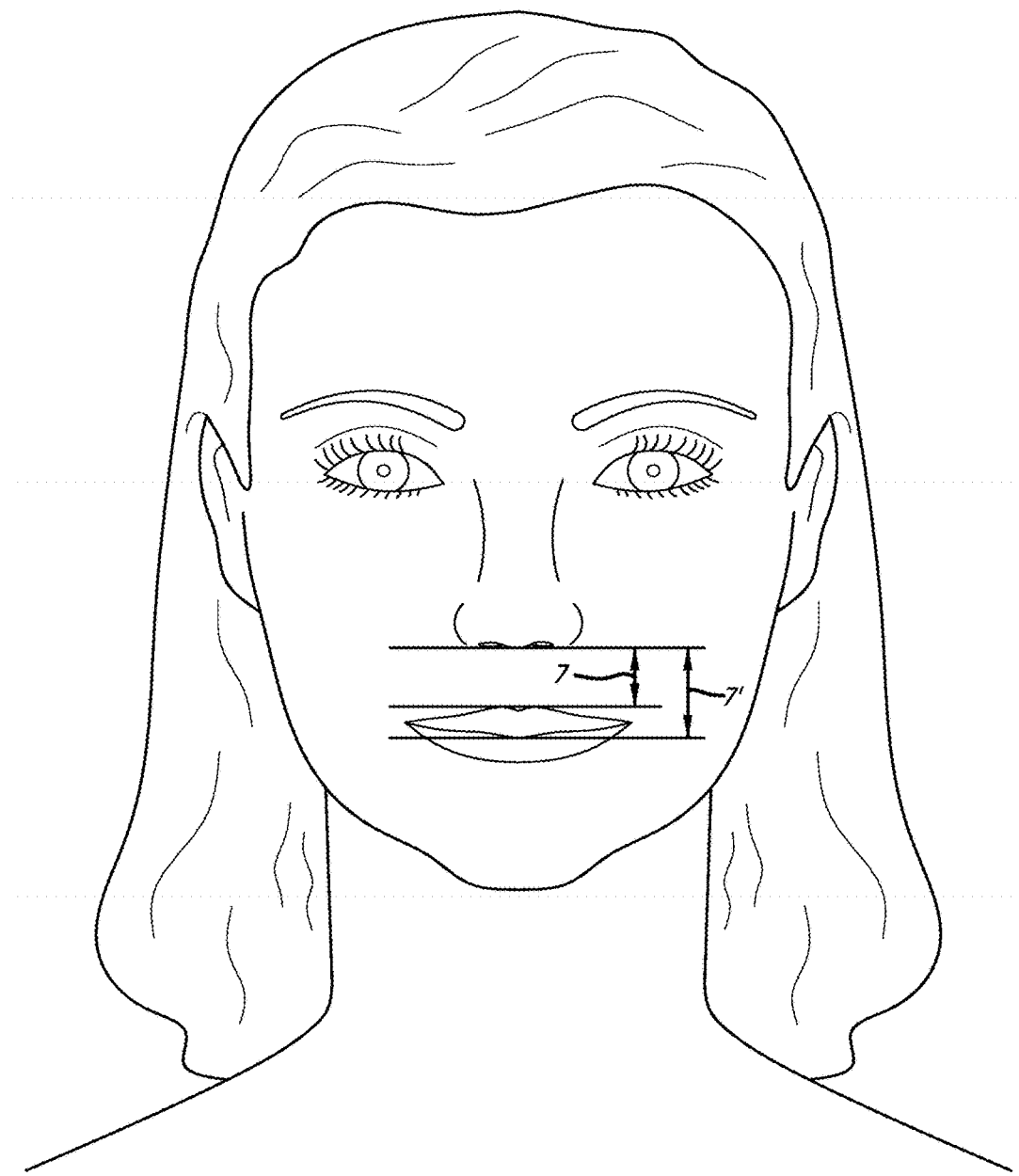
FIG. 3A is full-face frontal image of a person's face including various guide lines in accordance with a third form of the present disclosure.

As shown in FIG. 3A, there is a system and method comprising providing a frontal image of a person's face, including a base of the person's nose, tip end of the chin, cheeks, nostrils, eyes including irises, supraorbital margins, ears, and eyebrows.

A seventh prime distance extends in length from at the center of the lips to a point between at the base of the nose is determined. A seventh distance extends in length from at the top of the top lip at the center of the lip to a point between at the base of the nose is determined.

Then, a position above the top lip is determined such that the seventh distance is less than the seventh prime distance. This is at the golden ratio proportion relative to the seventh distance and forming a guide line substantially at the golden ratio distance.

The guide line is used to demarcate a limit for the application of contouring above the top lip and directed towards the ends of the lips on either side of the center of the lips. The area below the guide line and the top of the lip is demarcated for the application of contouring.

In other cases, the guide line is used to demarcate a limit for the application of highlighting above the top lip and directed towards the ends of the lips on either side of the center of the lips. The area below the guide line seven prime below the nose is demarcated for the application of contouring.

Figure 3B:
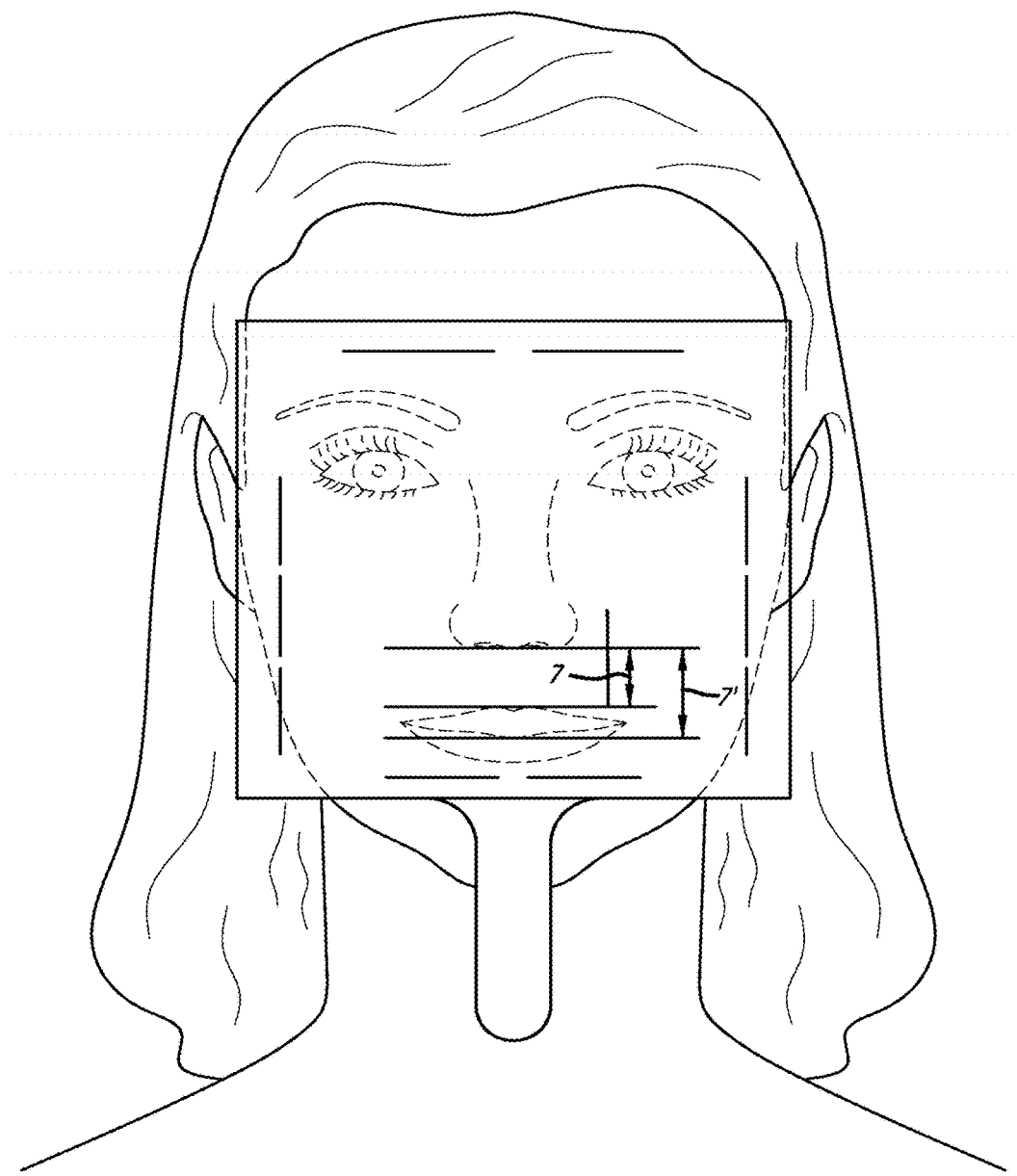
FIG. 3B is a stencil mask for a full-face frontal image of a person's face including various guide lines in accordance with a third form of the present disclosure.

As shown in FIG. 3B, the implementation of the shaping of the face of FIG. 3A is achieved by using a mask or stencil 3a with cut outs, which can be physical or electronically depicted on a screen having the characteristics of an at least partly vertical periphery or lines 3b and an at least partly horizontal periphery or lines 3c. These lines are necessary so that when person lines up their fade with the mask there alignment is correct. The face of the person when aligned with the mask or stencil should be straight and vertically disposed with the mask or stencil guide lines or periphery so that the overall mask or stencil is correctly aligned and when used to establish the location of the lines and spaces 7 and 7' which are also formed or placed on the mask or stencil, the mask or stencil is correctly located relative to the face.

Figure 4A:
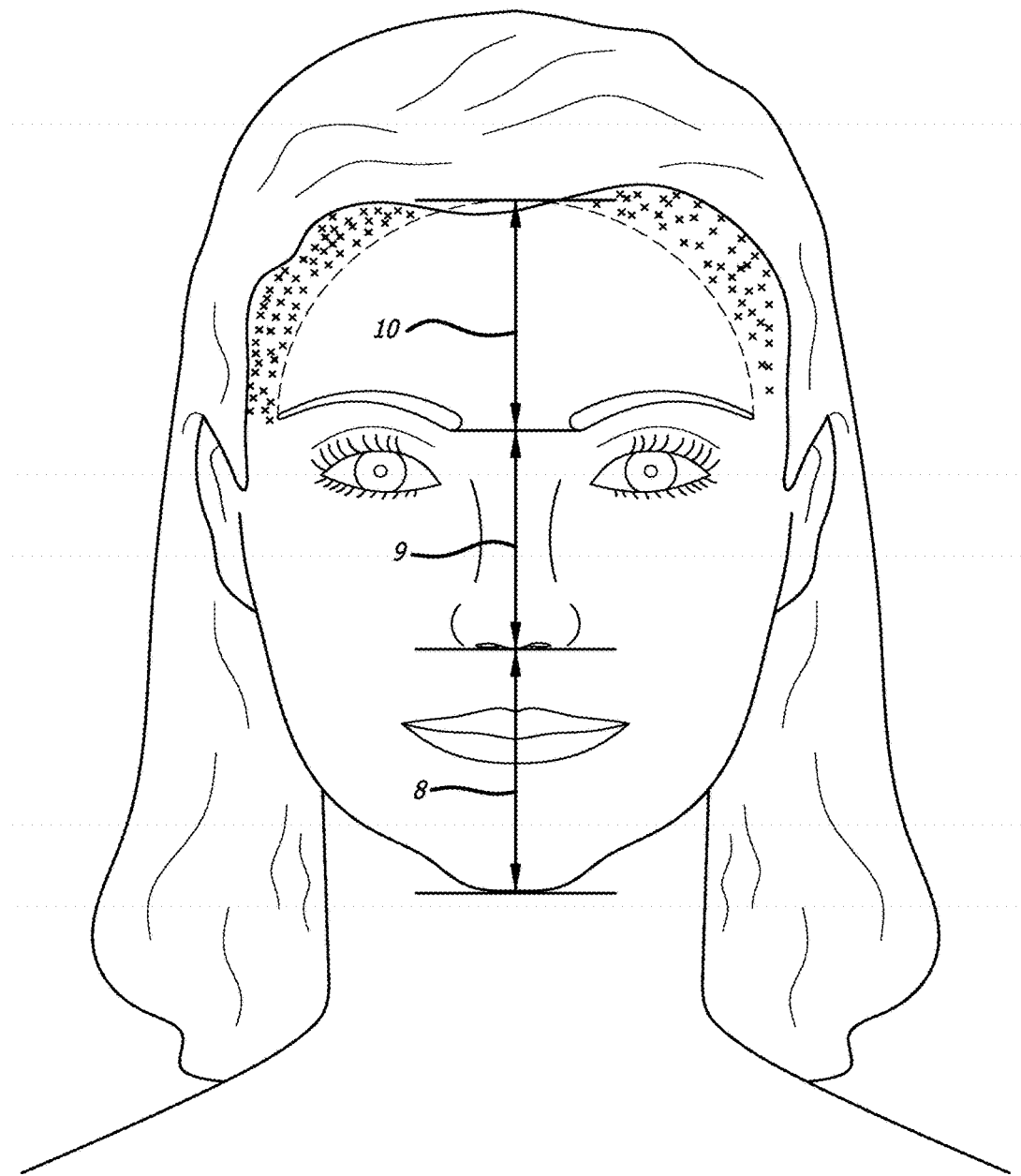
FIG. 4A is full-face frontal image of a person's face including various guide lines in accordance with a fourth form of the present disclosure.

As shown in FIG. 4A, there is a system and method comprising providing a frontal image of a person's face, including a base of the person's nose, tip end of the chin, cheeks, nostrils, eyes including irises, supraorbital margins, ears, and eyebrows.

An eighth distance extending in length from a point at the base of the nose to the tip end of the chin is determined. A ninth distance extends in length from a point at the base of the nose to a point between the eyebrows and above the nose is determined. A tenth distance extends in length from the point between the eyebrows and above the nose to a hair line above the nose is determined.

The area in the tenth distance is demarcated for the application of contouring to an extent to render it in appearance conceptually equal to the ninth distance.

The area in the eighth distance is demarcated for the application of contouring to an extent to render it in appearance conceptually equal to the ninth distance.

The area in the tenth distance is for contouring adjacent to and below the hairline, and the area above and adjacent to the eyebrows is non-contoured.

In some cases the area in the eighth distance is demarcated for the application of contouring to an extent to render it in appearance conceptually equal to the ninth distance, And the area in the tenth distance is for contouring adjacent to and below the hairline, and the area above and adjacent to the eyebrows is non-contoured. The ninth distance extends in length from a point at the base of the nose to a point between the eyebrows and above the nose is determined and is such that the eighth, ninth and tenth distances are substantially equal.

Figure 4B:
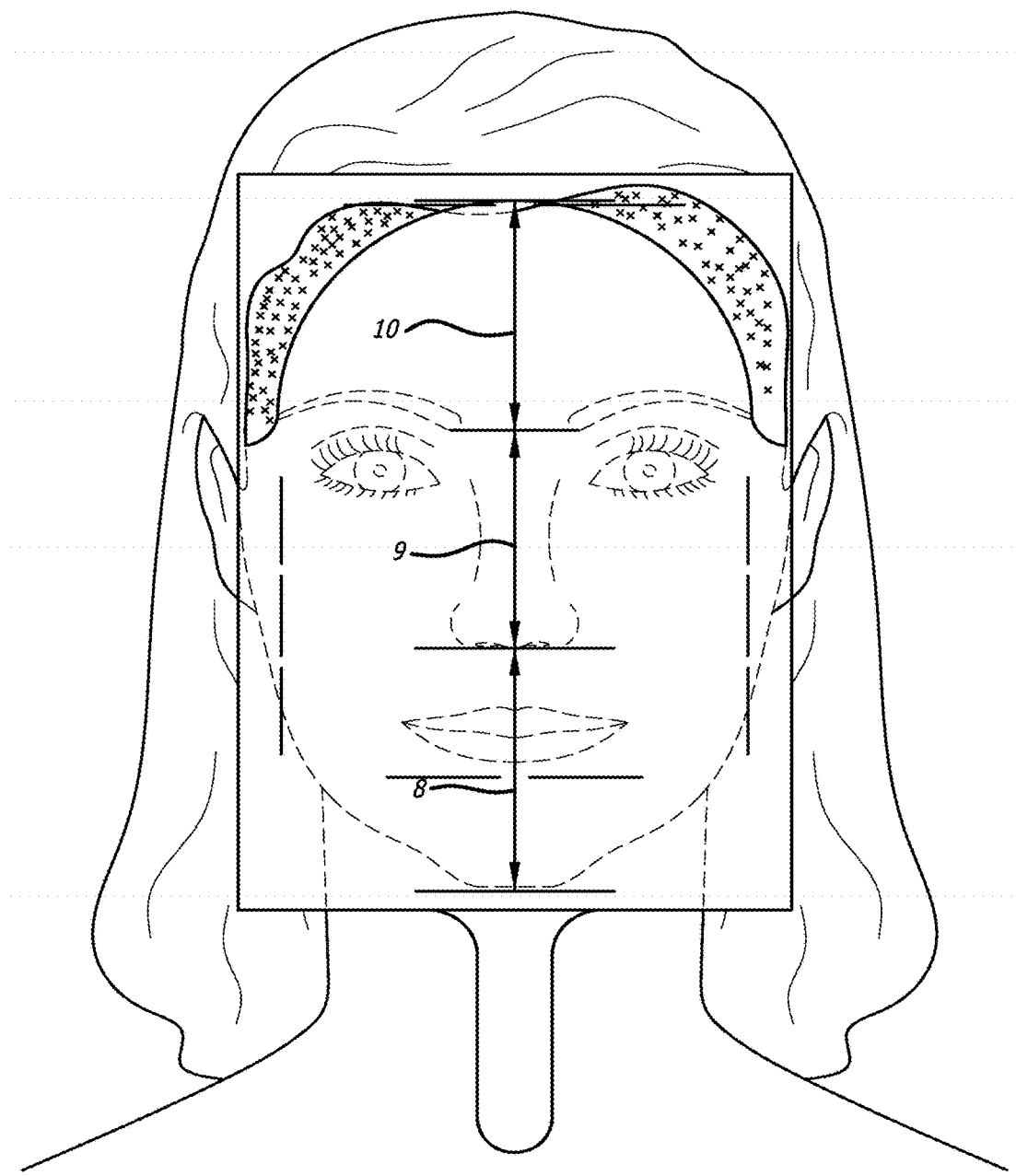
FIG. 4B is a stencil mask for a full-face frontal image of a person's face including various guide lines in accordance with a fourth form of the present disclosure.

As shown in FIG. 4B, the implementation of the shaping of the face of FIG. 4A is achieved by using a mask or stencil 4a with cut outs, which can be physical or electronically depicted on a screen having the characteristics of an at least partly vertical periphery or lines 4b and an at least partly horizontal periphery or lines 4c. These lines are necessary so that when person lines up their fade with the mask there alignment is correct. The face of the person when aligned with the mask or stencil should be straight and vertically disposed with the mask or stencil guide lines or periphery so that the overall mask or stencil is correctly aligned and when used to establish the location of the lines or spaces 8, 9 and 10 which are also formed or placed on the mask or stencil, the mask or stencil is correctly located relative to the face.

Figure 5A:
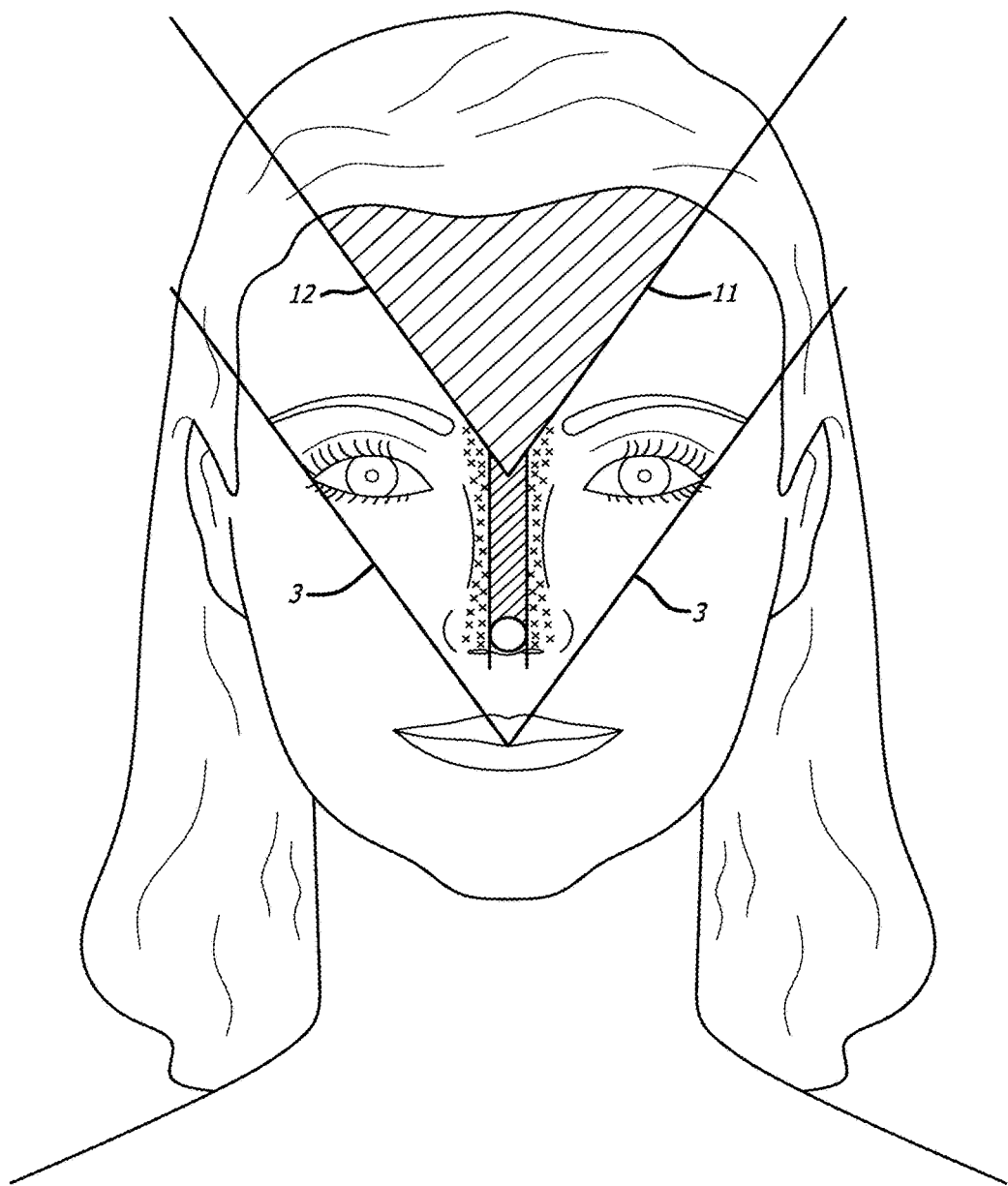
FIG. 5A is full-face frontal image of a person's face including various guide lines in accordance with a fifth form of the present disclosure.

As shown in FIG. 5A, there is a system and method comprising providing a frontal image of a person's face, including a base of the person's nose, tip end of the chin, cheeks, nostrils, eyes including irises, supraorbital margins, ears, and eyebrows.

An iris diameter is measured, and at the tip of the nose a portion for highlighting equal to the iris diameter is formed. In some cases, there can be contouring applied to that part of the top of the nose. This iris-sized tip portion of the nose can help define the overall facial structural shaping.

Highlighting is applied on a ridge of the nose between the nose tip towards the point between the eyes and contouring is applied on the nostrils to either side of the highlighted area.

An eleventh line is determined from a point above the nose and extending outwardly parallel to the third line. Further on the opposite side of the face there is created a twelfth line directed from the center of nose in an opposite side of the face.

Highlighting is applied in the forehead zone between those tenth and eleventh lines.

Figure 5B:
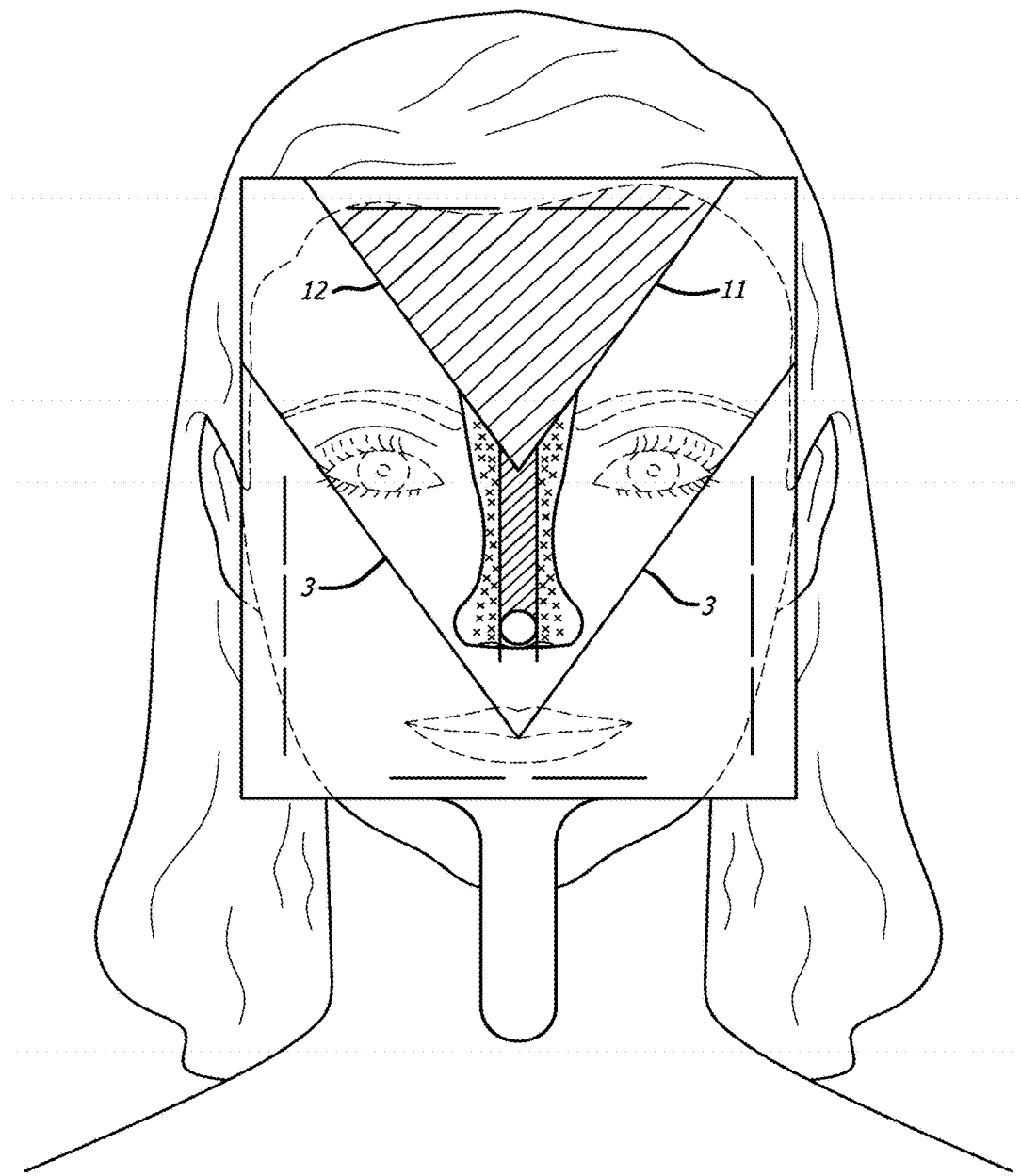
FIG. 5B is a stencil mask for a full-face frontal image of a person's face including various guide lines in accordance with a fifth form of the present disclosure.

As shown in FIG. 5B, the implementation of the shaping of the face of FIG. 5A is achieved by using a mask or stencil 5a with cut outs, which can be physical or electronically depicted on a screen having the characteristics of an at least partly vertical periphery or lines 5b and an at least partly horizontal periphery or lines 5c. These lines are necessary so that when person lines up their fade with the mask there alignment is correct. The face of the person when aligned with the mask or stencil should be straight and vertically disposed with the mask or stencil guide lines or periphery so that the overall mask or stencil is correctly aligned and when used to establish the location of the lines and spaces 3, 11 and 12 which are also formed or placed on the mask or stencil, the mask or stencil is correctly located relative to the face.

Figure 6A:
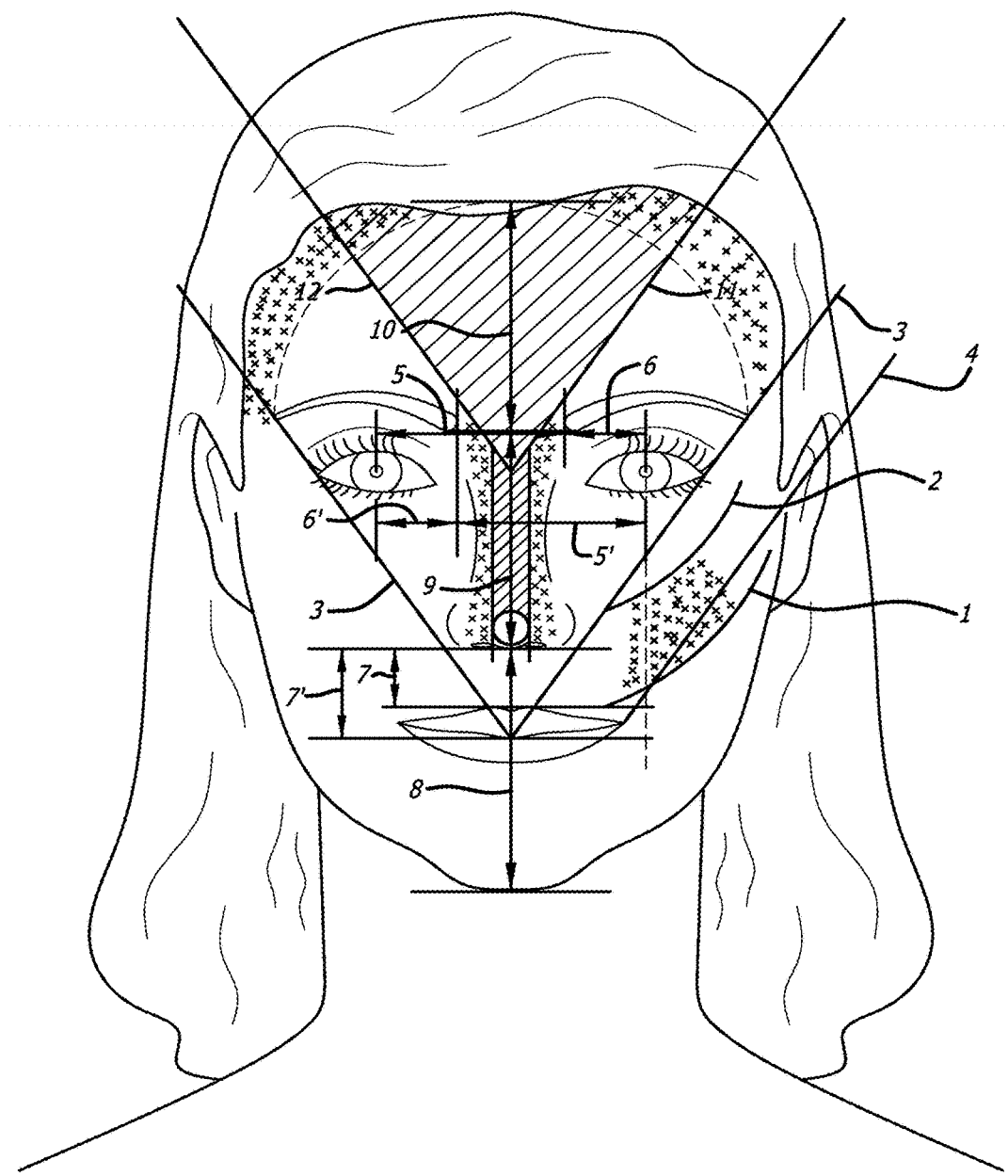
FIG. 6A is full-face frontal image of a person's face including various guide lines in accordance with a sixth form of the present disclosure.

In FIG. 6A, there is a system and method comprising providing a frontal image of a person's face, including a base of the person's nose, tip end of the chin, cheeks, nostrils, eyes including irises, supraorbital margins, ears, and eyebrows and integrating features of the features of FIGS. 1-5 into the face.

Figure 6B:
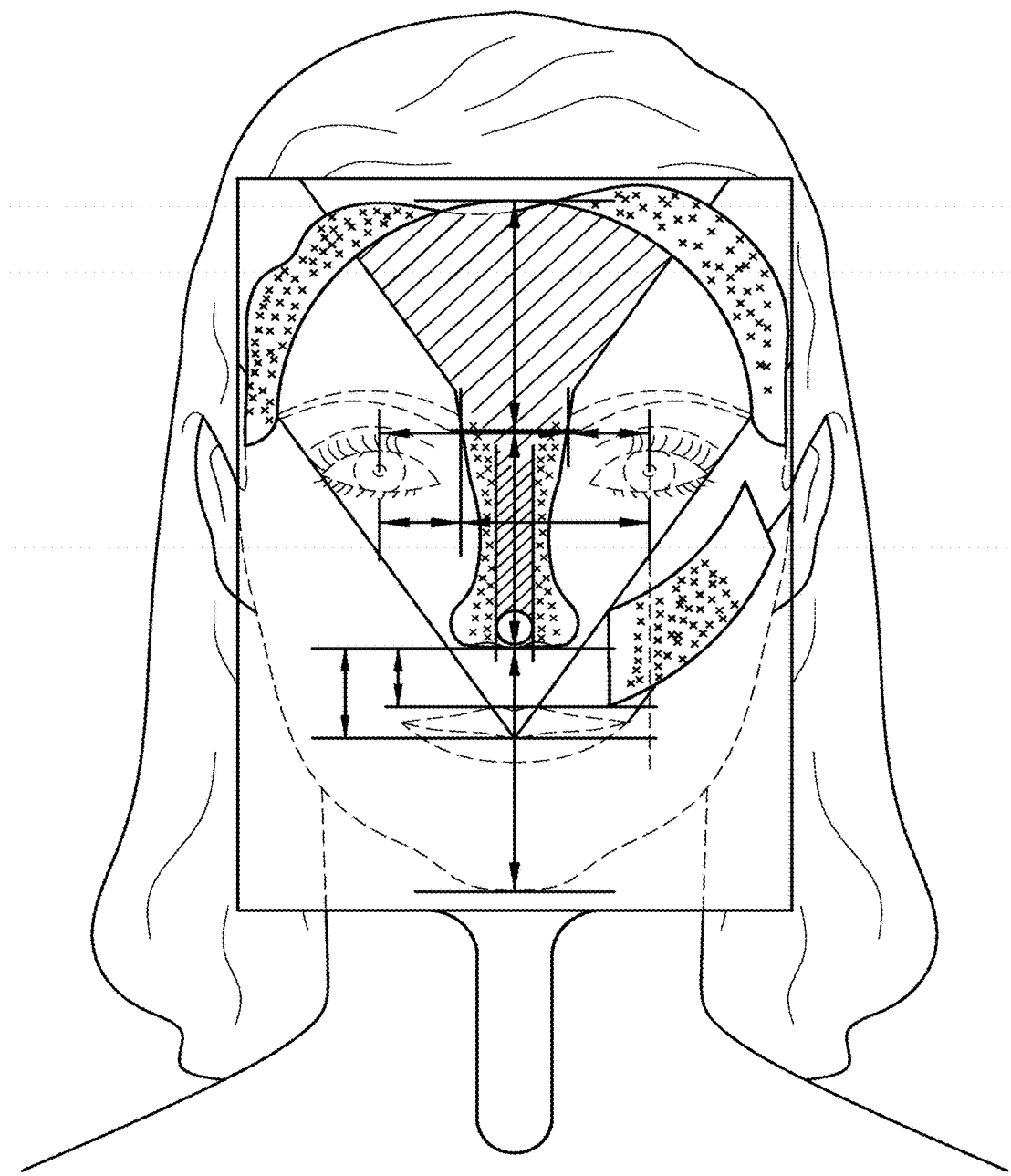
FIG. 6B is a stencil mask for a full-face frontal image of a person's face including various guide lines in accordance with a sixth form of the present disclosure.

As shown in FIG. 6B, the implementation of the shaping of the face of FIG. 6A is achieved by using a mask or stencil 6a with cut outs, which can be physical or electronically depicted on a screen having the characteristics of an at least partly vertical periphery or lines 6b and an at least partly horizontal periphery or lines 6c. These lines are necessary so that when person lines up their fade with the mask there alignment is correct. The face of the person when aligned with the mask or stencil should be straight and vertically disposed with the mask or stencil guide lines or periphery so that the overall mask or stencil is correctly aligned and when used to establish the location of the lines and spaces 1, 2, 3, 4, 5, 5', 6, 6', 7, 7', 8, 9 and 10 which are also formed or placed on the mask or stencil, the mask or stencil is correctly located relative to the face.

Figure 7:
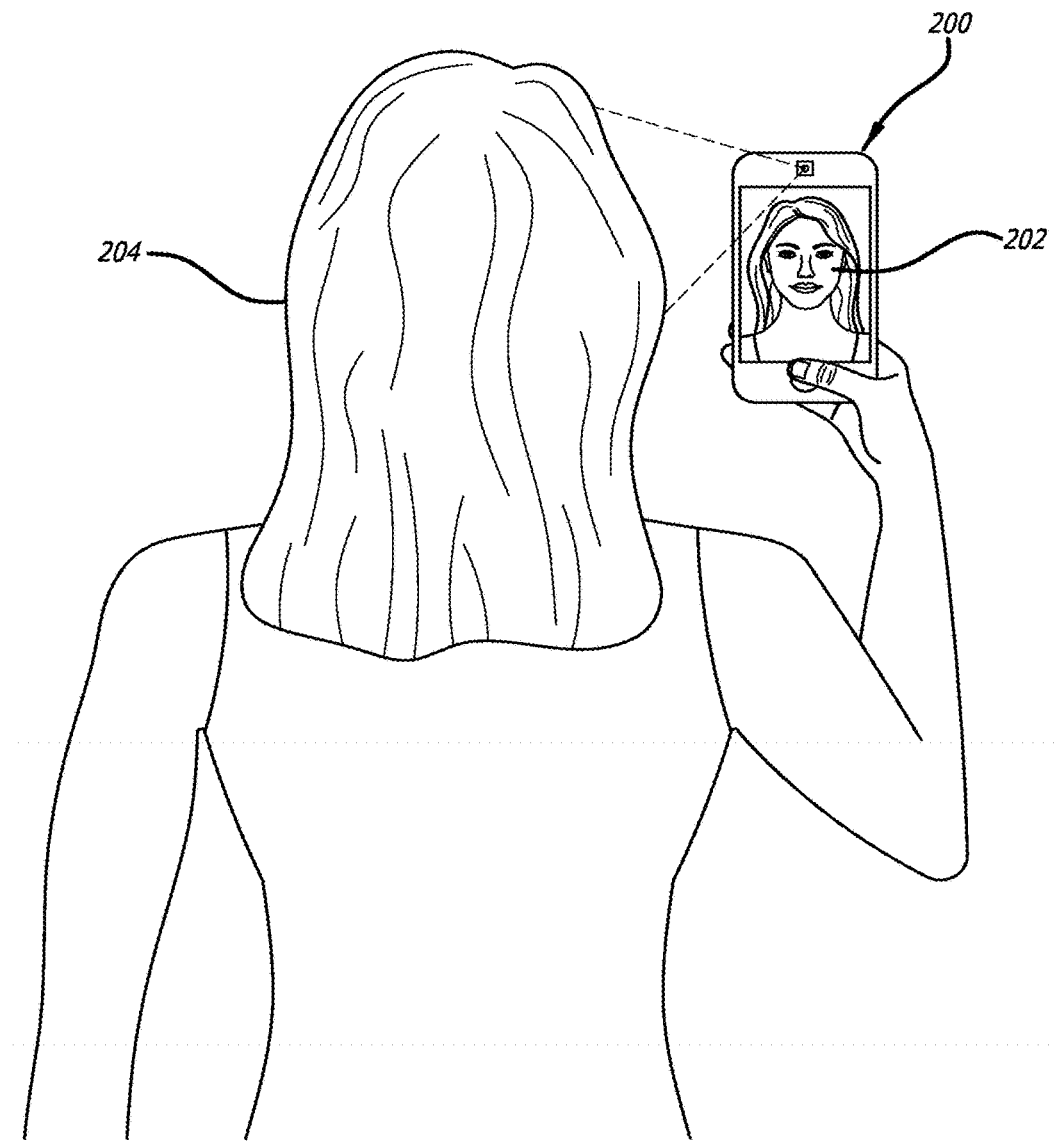
FIG. 7 is a person taking a photograph with a camera including a frontal image of a person's face in another form of the present disclosure.
Figure 8:
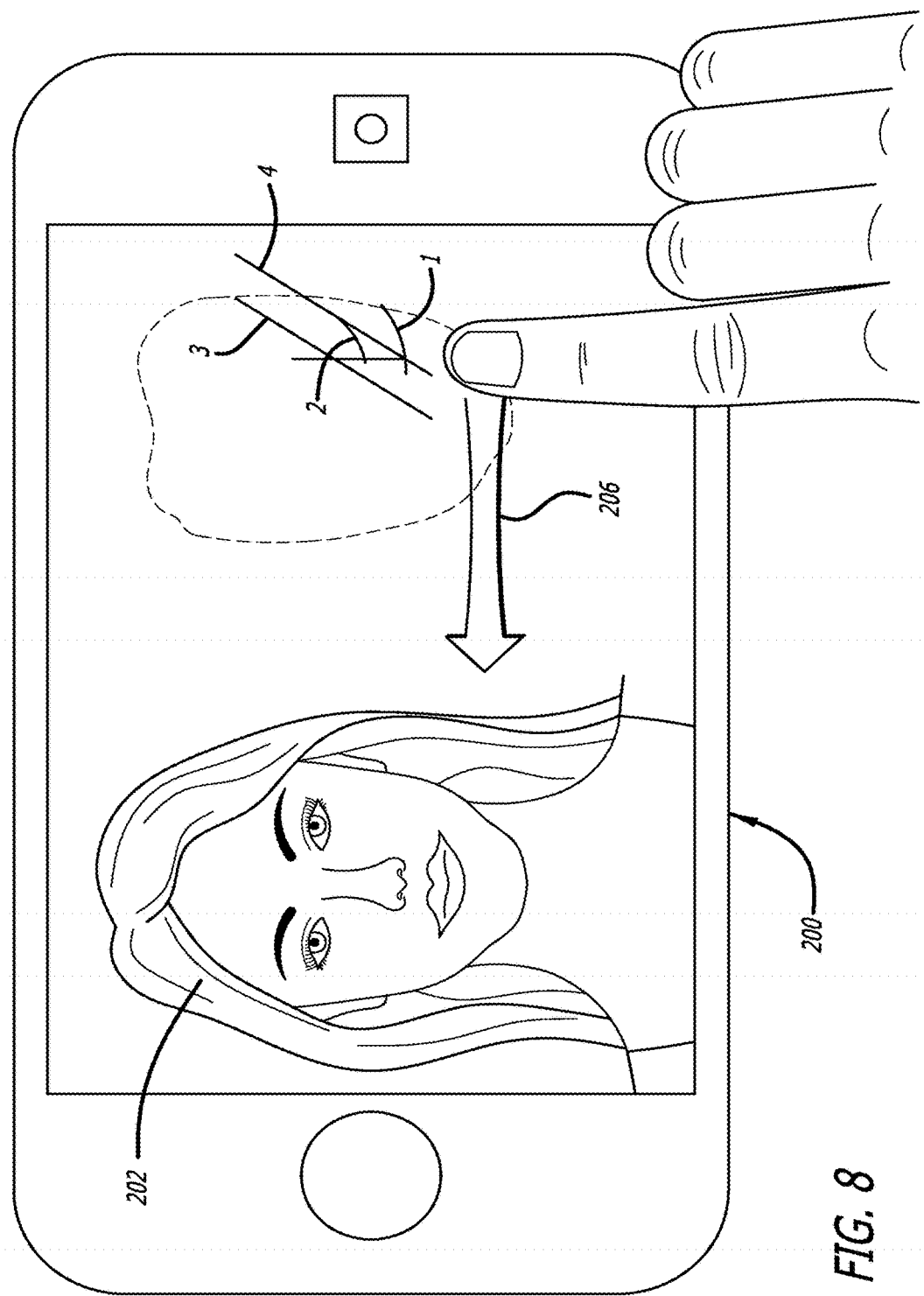
FIG. 8 is a person using the photograph on a camera monitor or screen including a frontal image of the person's face and acting to superimpose a template form over the face in another form of the present disclosure.

In FIGS. 7 and 8 there is shown a system and method applying the method or system of anyone or more of FIGS. 1 to 6. This is affected by applying a template or silhouette representing the lines and distances over a face of the person. The face 202 is represented as a photograph on a paper, transparency, monitor or screen of a computer, tablet or smart phone 200. The user 204 would apply, for instance by dragging as shown by arrow 206, the silhouette representation of FIGS. 1 to 6 over the photo of face 202 and with that, will be able to match a design an appropriate makeup formation over the face 202.

In other forms a surgeon would be using this disclosed method and system to design, create and build face structures as may be need in reconstructive surgery.

Methods and systems in accordance with the present disclosure enable even a relatively unskilled person to quickly and accurately determine the location and shape of her eyebrows according to the Golden Ratio standard. One exemplary method of the present disclosure is illustrated in FIGS. 1 to 6. The image 202 of the person's face may be a reflection in a mirror or it may be a displayed photographic image of the person's face on a display device such as on a laptop display, desktop computer display, tablet computer or cell phone screen. In a preferred embodiment, the image of the person's face is a full-face frontal view (i.e., taken at an angle of 0 degrees relative to the face). In another embodiment, the image may show only a portion of the face.

In other embodiments, the image may be taken from one side of the face at an angle of not greater than 45 degrees relative to the face, or more preferably at an angle of not greater than 20 degrees relative to the face, or more preferably at an angle of not greater than 10 degrees relative to the face.

A method and a system of applying the stencil and system uses a template representing the lines and distances over a face of the person, the face being represented as a photograph on a paper, transparency, monitor, or screen of a computer, tablet or smart phone.

Figure 9:
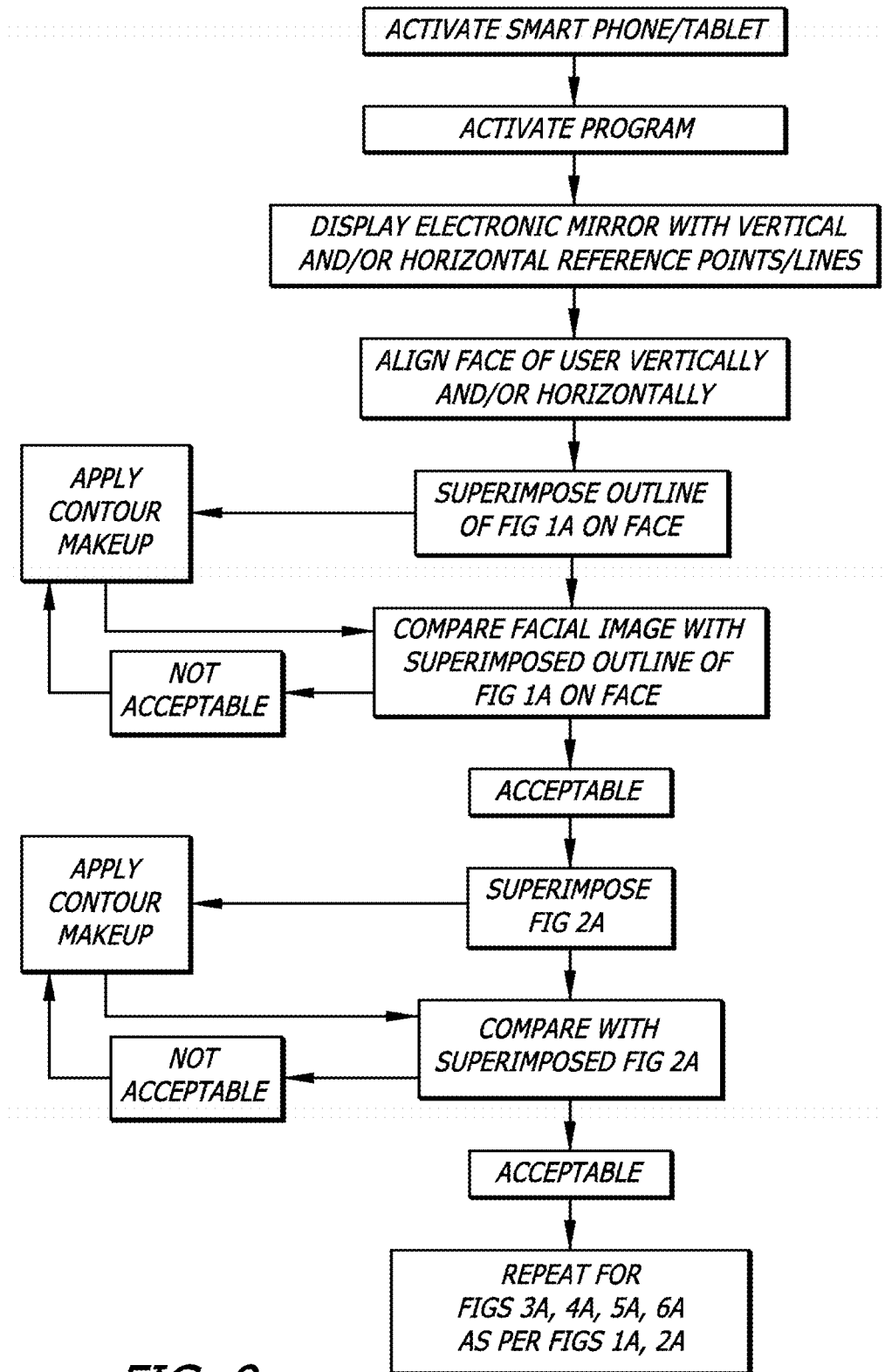
FIG. 9 is a first flow diagram of a program for use by a person using the image on a camera monitor or screen including a frontal image of the person's face and acting to superimpose a template form over the face in another form of the present disclosure.
Figure 10:
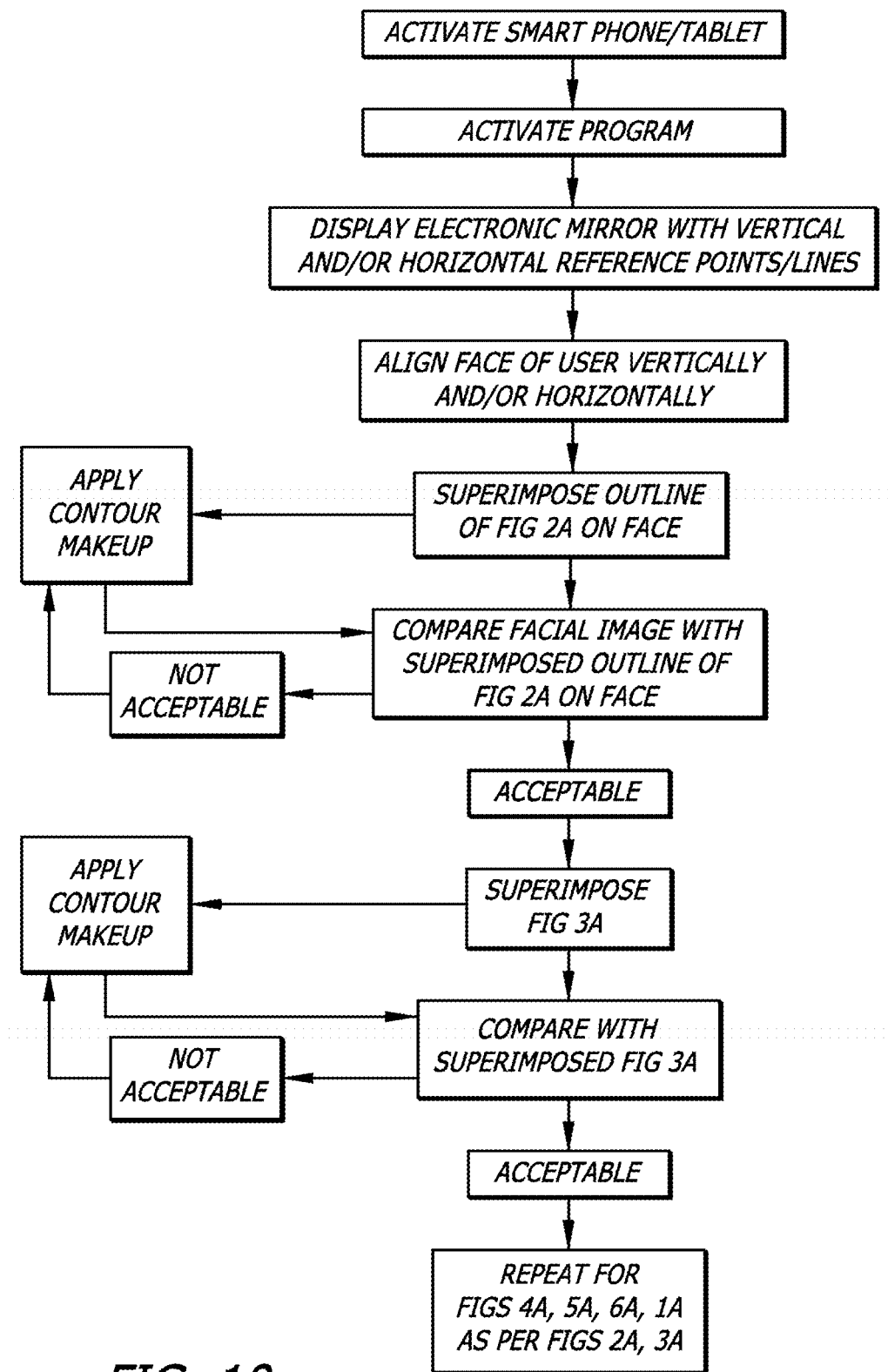
FIG. 10 is a second flow diagram of a program for use by a person using the image on a camera monitor or screen including a frontal image of the person's face and acting to superimpose a template form over the face in another form of the present disclosure.

In FIGS. 9 and 10 there are flow diagrams of a program for use by a person using the photograph on a camera monitor or screen including a frontal image of the person's face and acting to superimpose a template form over the face.

In FIGS. 9 and 10 there are flow diagrams showing the process by which the application is used electronically. The mirror utility of the app. on the screen shows the face of the user. The face is aligned vertically and/or horizontally with the image on the screen. The program will move to the next stage when this alignment is affected. If the alignment moves off vertical and or horizontal the program will not proceed to the next stage. There is a continual feedback to ensure the correct alignment.

At a next stage anyone or more of the images from FIG. 1A, 2A, 3A, 4A, 5A or 6A can be overlaid on the facial image. There is continual feedback and comparison of the facial image after makeup and/or contouring is applied to the face of the user with the ideal image as shown in FIG. 1A, 2A, 3A, 4A, 5A or 6A on the screen. When there is a satisfactory or acceptable result the user can move the program to the next image of FIG. 1A, 2A, 3A, 4A, 5A or 6A. The user can begin and end with any one of FIG. 1A, 2A, 3A, 4A, 5A or 6A and apply them in any order.

Regarding the superimposition action of the contour lines over the picture, this can be adjustable. This allows the user to drag that contour line image, drop it over the specific part of the face, and to stretch or minimize by using a touch screen to properly position it. The alignment needs to keep the proportions.

Figure 11:
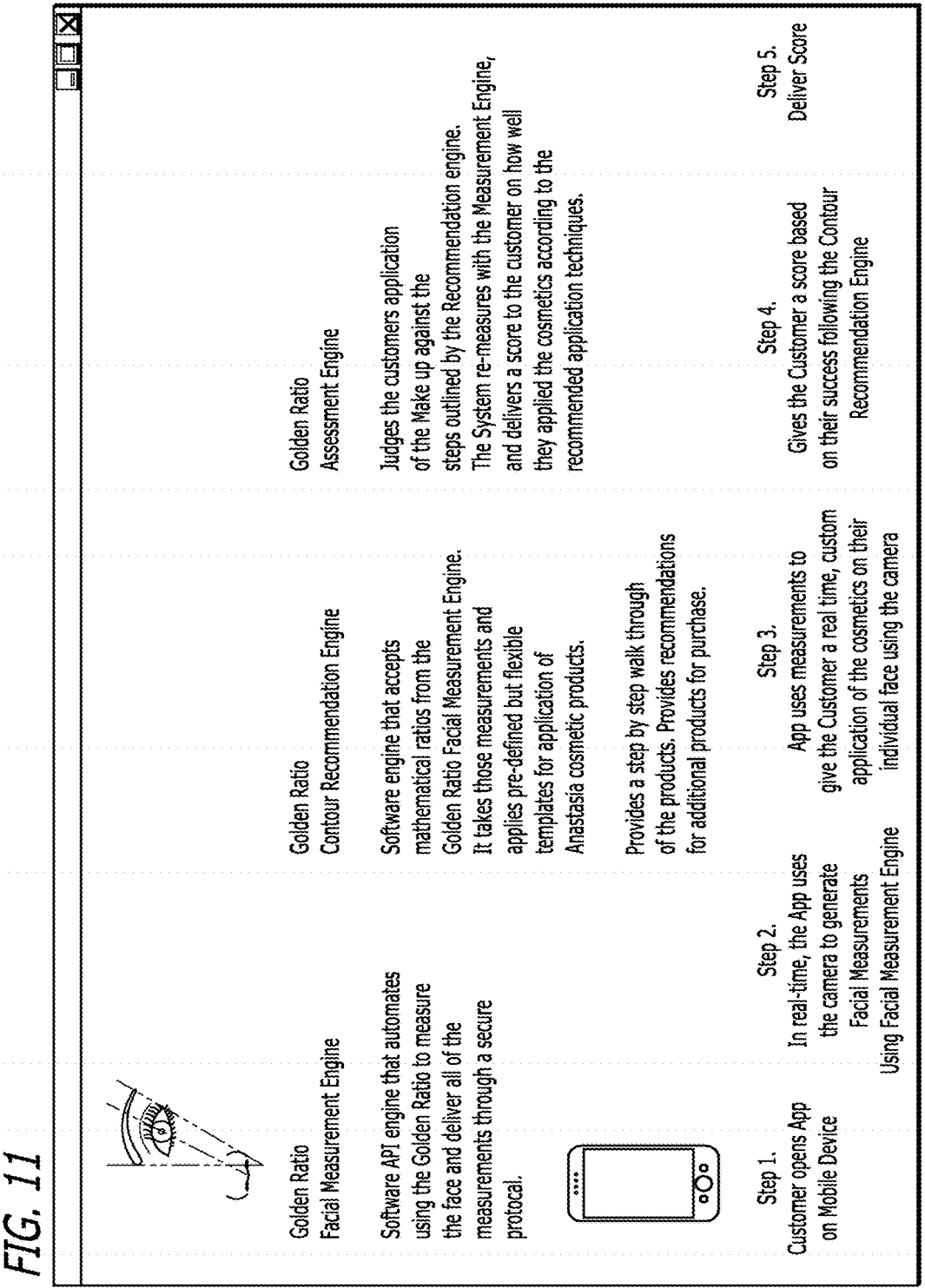
FIG. 11 is a diagram of another program for use by a person using the photograph on a camera monitor or screen including a frontal image of the person's face and acting to superimpose a template form over the face in another form of the present disclosure.

FIG. 11 is a diagram of another program for use by a person using the photograph on a camera monitor or screen including an image of the person's face and different engines.

The method and system comprising the steps of opening an App on a computer device. In substantially real-time the user uses the App using a camera to generate facial measurements using a facial measurement engine. Measurements give the user in real time data about a custom application of cosmetics on their individual face using the camera Then the user is given a score based on their success following a makeup and contour recommendation engine, and the score is delivered to the user.

The method includes applying a software API engine for using a Golden Ratio measure to the face and for delivering the measurements through a secure protocol to a user.

The method further includes applying a software engine for accepting mathematical ratios from a golden ratio facial measurement engine, using those measurements and applying pre-defined selectively flexible templates for application of cosmetic products to the face.

Also the method including representing a customer application of make up to the face and comparing the application against steps outlined by a recommendation engine, and effecting measurement with a measurement engine, and delivering a score to the user on how well they applied the cosmetics accords to a recommended application technique.

There are the following components, features of the method and system.

Golden Ratio Facial Measurement Engine

A software API engine automates using the Golden Ratio measures the face and deliver all of the measurements through a secure protocol.

Golden Ratio Contour Recommendation Engine

A software engine accepts mathematical ratios from the Golden Ratio Facial Measurement Engine. It takes those measurements and applies pre-defined but flexible templates for application of cosmetic products. Provides a step by step walkthrough of the products. Provides recommendations for additional products for purchase.

Golden Ratio Assessment Engine

Judges the customers application of the Make up against the steps outlined by the Recommendation engine. The system re-measures with the Measurement Engine, and delivers a score to the customer on how well they applied the cosmetics according to the recommended application techniques.

Steps of the operation include the following
1. Customer opens App on Mobile Device
2. In real-time, the App uses the camera to generate Facial Measurements Using Facial Measurement Engine
3. App uses measurements to give the Customer a real time. There is a custom application of the cosmetics on their individual face using the camera
4. Gives the Customer a score based on their success following the Contour Recommendation Engine
5. Delivers Score to the Customer.

Changes and alternatives may be introduced without departing from the spirit and broad scope of my invention as defined by the claims below and their equivalents.

The invention claimed is:
1. A method comprising:
providing a first stage represented image being a frontal image of a person's face, including a base of the person's nose, tip end of the chin, cheeks, nostrils, eyes including irises, supraorbital margins, ears, and eyebrows;
applying an electronic utility on an electronic screen thereby to show the face of the person;
providing feedback and comparison of the face of the person with the first stage represented image;
a user applying at least one of makeup or contouring to the face to represent the face;
after at least one of makeup or contouring is applied to the face of the user comparing at least one of the made up or contoured face with a represented image as shown in an electronic represented image on the screen;
opening a software application on a computer device;
applying in real-time the software application using a camera to generate facial measurements using a facial measurement engine;
using the measurements to give the user in real time data about a custom application of cosmetics on their individual face using the camera;
giving the user a score based on their success following a makeup and contour recommendation engine, and delivering the score to the user; and
determining a first distance extending in length from a point at the base of the nose to the tip end of the chin;
forming a first guide line on a cheek at a radius substantially equal to the first distance; the first guide line being user to demarcate a first limit for the application of contouring on the cheek;
determining a second distance being less than the first distance and being at the golden ratio proportion relative to the first distance and
forming a second guide line on the cheek at a radius substantially at the golden ratio distance; the second guide line being used to demarcate a second limit for the application of contouring on the cheek;
the area between the two lines being demarcated for the application of contouring;

determining third guide lines respectively from the center of the lips where the top and bottom lips meet each other, the third lines being directed respectively towards the ends of the respective eyes and over a forehead of the face;

determining an eleventh line from a point above the nose and extending outwardly parallel to a third line and over a forehead of the face; and creating a twelfth line directed from the center of the nose in a opposite side of the face and over a forehead of the face; and the area on the forehead between the eleventh and twelfth lines being demarcated for the application of highlighting or contouring.

2. A method comprising:

providing a first stage represented image being a frontal image of a person's face, including a base of the person's nose, tip end of the chin, cheeks, nostrils, eyes including irises, supraorbital margins, ears, and eyebrows;

applying an electronic utility on an electronic screen thereby to show the face of the person;

providing feedback and comparison of the face of the person with the first stage represented image;

a user applying at least one of makeup or contouring to the face to represent the face;

after at least one of makeup or contouring is applied to the face of the user comparing at least one of the made up or contoured face with a represented image as shown in an electronic represented image on the screen;

opening a software application on a computer device;

applying in real-time the software application using a camera to generate facial measurements using a facial measurement engine;

using the measurements to give the user in real time data about a custom application of cosmetics on their individual face using the camera;

giving the user a score based on their success following a makeup and contour recommendation engine, and delivering the score to the user; and determining a starting point for an eyebrow of each eye, ascertaining a fifth distance for that starting point, the fifth distance being determined by determining the golden ratio proportion of the distance between the center of the irises of the two eyes such that the golden ratio point indicates the starting point of the respective eyebrow, determining third guide lines respectively from the center of the lips where the top and bottom lips meet each other, the third lines being directed respectively towards the ends of the respective eyes and over a forehead of the face;

determining an eleventh line from a point above the nose and extending outwardly parallel to a third line and over a forehead of the face; and creating a twelfth line directed from the center of the nose in a opposite side of the face and over a forehead of the face; and the area on the forehead between the eleventh and twelfth lines being demarcated for the application of highlighting or contouring.

3. A method comprising:

providing a first stage represented image being a frontal image of a person's face, including a base of the person's nose, tip end of the chin, cheeks, nostrils, eyes including irises, supraorbital margins, ears, and eyebrows;

applying an electronic utility on an electronic screen thereby to show the face of the person;

providing feedback and comparison of the face of the person with the first stage represented image;

a user applying at least one of makeup or contouring to the face to represent the face;

after at least one of make up or contouring is applied to the face of the user comparing at least one of the made up or contoured face with a represented image as shown in an electronic represented image on the screen;

opening a software application on a computer device;

applying in real-time the software application using a camera to generate facial measurements using a facial measurement engine;

using the measurements to give the user in real time data about a custom application of cosmetics on their individual face using the camera;

giving the user a score based on their success following a makeup and contour recommendation engine, and delivering the score to the user; and determining a seventh prime distance extending in length from a point at the center of the lips to a point between at the base of the nose;

determining a seventh distance extending in length from at the top of the top lip at the center of the lip to a point between at the base of the nose;

determining a position above the top lip such that the seventh distance is less than the seventh prime distance and being at the golden ratio proportion relative to the seventh prime distance and forming a guide line substantially at the golden ratio distance; the guide line being used to demarcate a limit for the application of make up or contouring above the top lip and directed towards the ends of the lips on either side of the center of the lips;

the area below the guide line and the top of the lip being demarcated for the application of make up or contouring, determining third guide lines respectively from the center of the lips where the top and bottom lips meet each other, the third lines being directed respectively towards the ends of the respective eyes and over a forehead of the face;

determining an eleventh line from a point above the nose and extending outwardly parallel to a third line and over a forehead of the face; and creating a twelfth line directed from the center of the nose in a opposite side of the face and over a forehead of the face; and the area on the forehead between the eleventh and twelfth lines being demarcated for the application of highlighting or contouring.

4. A method comprising:

providing a first stage represented image being an image of a person's face, including a base of the person's nose, tip end of the chin, cheeks, nostrils, eyes including irises, supraorbital margins, ears, and eyebrows;

applying an electronic utility on an electronic screen thereby to show the face of the person;

providing feedback and comparison of the face of the person with the first stage represented image;

a user applying at least one of makeup or contouring to the face to represent the face;

after at least one of makeup or contouring is applied to the face of the user comparing at least one of the made up or contoured face with a represented image as shown in an electronic represented image on the screen;

opening a software application on a computer device;
applying in real-time the software application using a camera to generate facial measurements using a facial measurement engine;
using the measurements to give the user in real time data about a custom application of cosmetics on their individual face using the camera;
giving the user a score based on their success following a makeup and contour recommendation engine, and delivering the score to the user;
providing a frontal image of a person's face, including a base of the person's nose, tip end of the chin, cheeks, nostrils, eyes including irises, supraorbital margins, ears, and eyebrows;
determining an eighth distance extending in length from a point at the base of the nose to the tip end of the chin;
determining a ninth distance extending in length from a point at the base of the nose to a point between the eyebrows and above the nose;
determining a tenth distance extending in length from the point between the eyebrows and above the nose to a hair line above the nose;
the area in the tenth distance being demarcated for the application of contouring to an extent to render it in appearance conceptually equal to the eighth distance,
determining third guide lines respectively from the center of the lips where the top and bottom lips meet each other, the third lines being directed respectively towards the ends of the respective eyes and over a forehead of the face;
determining an eleventh line from a point above the nose and extending outwardly parallel to a third line and over a forehead of the face; and
creating a twelfth line directed from the center of the nose in a opposite side of the face and over a forehead of the face; and
the area on the forehead between the eleventh and twelfth lines being demarcated for the application of highlighting or contouring.

5. A method comprising:
providing a first stage represented image being a frontal image of a person's face, including a base of the person's nose, tip end of the chin, cheeks, nostrils, eyes including irises, supraorbital margins, ears, and eyebrows;
applying an electronic utility on an electronic screen thereby to show the face of the person;
providing feedback and comparison of the face of the person with the first stage represented image;
a user applying at least one of makeup or contouring to the face to represent the face;
after at least one of makeup or contouring is applied to the face of the user comparing at least one of the made up or contoured face with a represented image as shown in an electronic represented image on the screen;
opening a software application on a computer device;
applying in real-time the software application using a camera to generate facial measurements using a facial measurement engine;
using the measurements to give the user in real time data about a custom application of cosmetics on their individual face using the camera;
giving the user a score based on their success following a makeup and contour recommendation engine, and delivering the score to the user; and
determining third guide lines respectively from the center of the lips where the top and bottom lips meet each other, the third lines being directed respectively towards the ends of the respective eyes and over a forehead of the face;
determining an eleventh line from a point above the nose and extending outwardly parallel to a third line and over a forehead of the face; and
creating a twelfth line directed from the center of the nose in a opposite side of the face and over a forehead of the face; and
the area on the forehead between the eleventh and twelfth lines being demarcated for the application of highlighting or contouring.

6. A method of applying claim 1 comprising:
providing a frontal image of a person's face, including a base of the person's nose, tip end of the chin, cheeks, nostrils, eyes including irises, supraorbital margins, ears, and eyebrows;
measuring an iris diameter,
forming at the tip of the nose a portion for highlighting equal to the iris diameter.

7. A method of applying claim 1 by applying the mask or stencil as a template representing the lines and distances over a face of the person, the face being represented as a photograph on a paper, transparency, monitor, or screen of a computer, tablet or smart phone.

8. The method of applying claim 2 comprising:
providing a frontal image of a person's face, including a base of the person's nose, tip end of the chin, cheeks, nostrils, eyes including irises, supraorbital margins, ears, and eyebrows;
measuring an iris diameter,
forming at the tip of the nose a portion for highlighting equal to the iris diameter.

9. The method of applying claim 2 by applying the mask or stencil as a template representing the lines and distances over a face of the person, the face being represented as a photograph on a paper, transparency, monitor, or screen of a computer, tablet or smart phone.

10. The method of applying claim 3 comprising:
providing a frontal image of a person's face, including a base of the person's nose, tip end of the chin, cheeks, nostrils, eyes including irises, supraorbital margins, ears, and eyebrows;
measuring an iris diameter,
forming at the tip of the nose a portion for highlighting equal to the iris diameter.

11. The method of applying claim 3 by applying the mask or stencil as a template representing the lines and distances over a face of the person, the face being represented as a photograph on a paper, transparency, monitor, or screen of a computer, tablet or smart phone.

12. The method of applying claim 4 comprising:
providing a frontal image of a person's face, including a base of the person's nose, tip end of the chin, cheeks, nostrils, eyes including irises, supraorbital margins, ears, and eyebrows;
measuring an iris diameter,
forming at the tip of the nose a portion for highlighting equal to the iris diameter.

13. The method of applying claim 4 by applying the mask or stencil as a template representing the lines and distances over a face of the person, the face being represented as a photograph on a paper, transparency, monitor, or screen of a computer, tablet or smart phone.

14. The method of applying claim 5 comprising:
providing a frontal image of a person's face, including a base of the person's nose, tip end of the chin, cheeks, nostrils, eyes including irises, supraorbital margins, ears, and eyebrows;
measuring an iris diameter,
forming at the tip of the nose a portion for highlighting equal to the iris diameter.

15. The method of applying claim 5 by applying the mask or stencil as a template representing the lines and distances over a face of the person, the face being represented as a photograph on a paper, transparency, monitor, or screen of a computer, tablet or smart phone.

16. The method of applying claim 1 wherein the computing device is selectively a computer, tablet or smart phone.

17. The method of applying claim 2 wherein the computing device is selectively a computer, tablet or smart phone.

18. The method of applying claim 3 wherein the computing device is selectively a computer, tablet or smart phone.

19. The method of applying claim 4 wherein the computing device is selectively a computer, tablet or smart phone.

20. The method of applying claim 5 wherein the computing device is selectively a computer, tablet or smart phone.

21. A method comprising:
providing a frontal image of a person's face, including a base of the person's nose, tip end of the chin, cheeks, nostrils, eyes including irises, supraorbital margins, ears, and eyebrows;
determining on the image a first distance extending in length from a point at the base of the nose to the tip end of the chin;
creating, forming and drawing a first physical guide line on the image of one of the cheeks at a radius from the iris of the person's closest eye to the one cheek substantially equal to the first distance; the first physical guide line being used to demarcate a first limit for the application of contouring on the one cheek;
determining on the image a second distance being less than the first distance and being at the golden ratio proportion relative to the first distance and
creating, forming and drawing a second physical guide line on the image of the one cheek at a radius substantially at the golden ratio distance; the second physical guide line being used to demarcate a second limit for the application of contouring on the one cheek;
the area between the two physical lines being demarcated for the application of contouring;
applying and using a physical facial stencil on the person's face with a physical cut out to relate to the first and second physical guide lines determined from the image, the stencil having at least one of a peripheral physical outline including a physical straight edge or a physical straight line for location relative the face, the physical straight edge or the physical straight line being for location substantially horizontally or vertically relative to the face when contouring is to be applied to the face, such that the face and the physical stencil are aligned in a correct vertical sense with each other when the physical lines for contouring are demarcated; and
applying makeup to the person's face to represent and shape the contouring using the physical stencil with physical cut out and the first physical guide line and the second physical guide line related to the first and second guide lines with the stencil straight edge or straight line located relative the face and the straight edge or the straight line being located substantially horizontally or vertically relative to the face when contouring is to be applied to the face, such that the face and the stencil are aligned in a correct vertical sense with each other when the contouring is applied.

* * * * *

UNITED STATES PATENT AND TRADEMARK OFFICE
CERTIFICATE OF CORRECTION

PATENT NO. : 10,650,224 B2
APPLICATION NO. : 15/680255
DATED : May 12, 2020
INVENTOR(S) : Soare et al.

Page 1 of 2

It is certified that error appears in the above-identified patent and that said Letters Patent is hereby corrected as shown below:

In the Specification

In Column 1, Line 16, delete "& in" and insert -- in --, therefor.

In Column 3, Line 36, delete "relative the face." and insert -- relative to the face. --, therefor.

In Column 3, Line 67, delete "relative the face," and insert -- relative to the face, --, therefor.

In Column 4, Line 28, delete "relative the face," and insert -- relative to the face, --, therefor.

In Column 4, Line 50, delete "relative the face," and insert -- relative to the face, --, therefor.

In Column 4, Line 65, delete "relative the face," and insert -- relative to the face, --, therefor.

In Column 5, Lines 47-48, delete "fade with the mask there alignment" and insert -- face with the mask their alignment --, therefor.

In Column 6, Lines 4-5, delete "fade with the mask there alignment" and insert -- face with the mask their alignment --, therefor.

In Column 6, Lines 45-46, delete "fade with the mask there alignment" and insert -- face with the mask their alignment --, therefor.

In Column 7, Lines 24-25, delete "fade with the mask there alignment" and insert -- face with the mask their alignment --, therefor.

In Column 7, Lines 59-60, delete "fade with the mask there alignment" and insert -- face with the mask their alignment --, therefor.

Signed and Sealed this
Thirteenth Day of October, 2020

Andrei Iancu
*Director of the United States Patent and Trademark Office*

CERTIFICATE OF CORRECTION (continued)
U.S. Pat. No. 10,650,224 B2

In Column 8, Lines 13-14, delete "fade with the mask there alignment" and insert -- face with the mask their alignment --, therefor.

In Column 8, Line 35, delete "may be need" and insert -- may be needed --, therefor.

In the Claims

In Column 16, Line 18, in Claim 21, delete "relative the face," and insert -- relative to the face, --, therefor.

In Column 16, Line 30, in Claim 21, delete "relative the face" and insert -- relative to the face --, therefor.